United States Patent
Kim

(10) Patent No.: US 11,046,612 B2
(45) Date of Patent: Jun. 29, 2021

(54) WATER-IMPERMEABLE WATERPROOF ASPHALT CONCRETE COMPOSITION COMPRISING STYRENE ISOPRENE STYRENE AND METHOD OF CONSTRUCTING INTEGRATED WATER-IMPERMEABLE WATERPROOF ASPHALT CONCRETE PAVEMENT USING THE METHOD AND MIXING/FEEDING SYSTEM

(71) Applicant: GK INSTITUTE OF TECHNOLOGY CO., LTD, Chuncheon-si (KR)

(72) Inventor: In Joong Kim, Namyangju-si (KR)

(73) Assignee: GK INSTITUTE OF TECHNOLOGY CO., LTD, Chuncheon-si (KR)

( * ) Notice: Subject to any disclaimer, the term of this patent is extended or adjusted under 35 U.S.C. 154(b) by 0 days.

(21) Appl. No.: 16/517,344

(22) Filed: Jul. 19, 2019

(65) Prior Publication Data

US 2020/0385310 A1    Dec. 10, 2020

(30) Foreign Application Priority Data

May 15, 2019    (KR) .................. 10-2019-0057117

(51) Int. Cl.
| | |
|---|---|
| *C04B 26/26* | (2006.01) |
| *C04B 18/02* | (2006.01) |
| *C04B 24/26* | (2006.01) |
| *C04B 24/28* | (2006.01) |
| *C04B 111/00* | (2006.01) |
| *C04B 111/27* | (2006.01) |

(52) U.S. Cl.
CPC .............. *C04B 26/26* (2013.01); *C04B 18/02* (2013.01); *C04B 24/2611* (2013.01); *C04B 24/2676* (2013.01); *C04B 24/283* (2013.01); *C04B 2111/0075* (2013.01); *C04B 2111/27* (2013.01)

(58) Field of Classification Search
CPC ..... C04B 26/26; C04B 18/02; C04B 24/2611; C04B 24/2676; C04B 24/283; C08L 95/00
See application file for complete search history.

(56) References Cited

U.S. PATENT DOCUMENTS

| | | | |
|---|---|---|---|
| 8,404,037 B2 * | 3/2013 | Naidoo | ................... C08L 91/06 106/273.1 |
| 2018/0100066 A1 * | 4/2018 | Kim | .......................... C08L 9/06 |

FOREIGN PATENT DOCUMENTS

| | | |
|---|---|---|
| KR | 10-1835081 B1 | 4/2018 |
| KR | 101835081 B1 * | 4/2018 |

OTHER PUBLICATIONS

EPO Machine translation of Korean Patent 10-1835081 B1. (Year: 2018).*

* cited by examiner

*Primary Examiner* — Michael P Wieczorek
(74) *Attorney, Agent, or Firm* — Im IP Law; Chai Im; C. Andrew Im

(57) ABSTRACT

A water-impermeable waterproof asphalt concrete composition having styrene isoprene styrene (SIS). The composition's waterproof performance due to its high cohesion and adhesion. The composition is durable and is not easily rutted, aged and/or stripped. In addition, the composition has a performance grade of PG 82-34, and can prevent water penetration and potholes. Furthermore, the asphalt concrete for prime coating and waterproof asphalt concrete can be applied to form an integrated structure by using a mixing/feeding system and can also be easily placed on site.

14 Claims, No Drawings

WATER-IMPERMEABLE WATERPROOF ASPHALT CONCRETE COMPOSITION COMPRISING STYRENE ISOPRENE STYRENE AND METHOD OF CONSTRUCTING INTEGRATED WATER-IMPERMEABLE WATERPROOF ASPHALT CONCRETE PAVEMENT USING THE METHOD AND MIXING/FEEDING SYSTEM

RELATED APPLICATION

This application claims priority from Korean Patent Application No. 10-2019-0057117 filed Jun. 5, 2019, which is incorporated herein by reference in its entirety.

FIELD OF THE INVENTION

The present invention relates to a water-impermeable waterproof asphalt concrete composition comprising styrene isoprene styrene (SIS) and a method of constructing integrated water-impermeable waterproof asphalt concrete pavement by using the composition and a mixing/feeding system, and more particularly to a water-impermeable waterproof asphalt concrete composition having improved waterproof performance by comprising SIS which improves the physical properties of asphalt concrete, and a method of constructing integrated water-impermeable waterproof asphalt concrete pavement by using the composition and a mixing/feeding system.

BACKGROUND OF THE INVENTION

Generally, asphalt is a black or dark brown solid or semi-solid thermoplastic material that has a complex structure composed of thousands of different types of macromolecular hydrocarbon (CH) and contains organic compounds and trace amounts of inorganic compounds. It has the property of gradually changing into liquid phase upon heating.

The asphalt is divided into several types, such as natural asphalt, petroleum-based asphalt, and road tar, and straight asphalt and emulsified asphalt are widely known.

Furthermore, the asphalt has excellent stickiness and excellent adhesion to mineral materials, and thus is used as a bonding material or an adhesive material. Moreover, it is not soluble in water and impermeable, it is also used as a waterproof material. In addition, it is used in a wide range of applications since the viscosity thereof can be changed according to the intended use. In addition, it is used in various applications, including road pavement, waterproofing, general industrial applications, and agricultural applications.

As asphalt for road pavement, straight asphalt which is petroleum-based asphalt having excellent adhesion, extensibility and water absorption/permeation ability is generally used.

However, since straight asphalt has disadvantages of low softening point, high temperature sensitivity, weak weather resistance and weak cohesive strength, various modifiers are added to the straight asphalt in order to overcome these disadvantages and to meet the characteristics of the place where it is used.

In general, examples of asphalt modifiers include rubber-based modifiers, thermoplastic resin-based modifiers, thermosetting resin-based modifiers, filler-based modifiers, fiber-based modifiers, antioxidants, reducing agents, and the like. The rubber-based modifiers include styrene butadiene rubber (SBR), crumb rubber, and the like; the thermoplastic resin-based modifiers include styrene butadiene styrene (SBS), ethylene vinyl acetate (EVA), polyethylene (PE), polypropylene (PP), polyvinyl chloride (PVC), polyethylene terephthalate (PET), and the like; the thermosetting resin-based modifiers include epoxy resin, urethane resin, acrylic resin, phenol resin, petroleum resin, and the like; and the hydrocarbon-based modifiers include natural asphalt, gilsonite, and the like.

However, the asphalt modifiers developed so far have problems associated with the cracking and rutting (plastic deformation) of pavement, which appear because the resistances of the asphalt to low-temperature cracking and fatigue cracking are decreased by a significant temperature difference between the four seasons with the passage of time after construction. In addition, these asphalt modifiers show problems, such as asphalt oxidation caused by exposure to air and sunlight, and aggregate loss caused by reduction in adhesion. In addition, in the case of plant-mix type modifiers, it is not easy to ensure uniform quality, and in the case of pre-mix type modified asphalt, it is not easy to mix components uniformly, and components such as a modifier and asphalt depend on physical bonding, and thus the storage stability of the asphalt is low, indicating that it is difficult to store the asphalt.

Especially, since the year 2000, modified concrete having improved concrete performance by comprising rapidly hardening cement and polymers have been developed and widely used as a repair material for concrete road structures due to its short hardening time and highwater permeability resistance and freezing-thawing resistance.

However, the modified concrete has a problem in that it is costly because of containing a large amount of latex. It also has a problem in that it has low heat reflection rate, and thus its preventive effect against early freezing in the winter season is insufficient compared to that of conventional asphalt concrete. In addition, it has a problem in that the heat absorption rate is low, and thus, cracking, surface stripping, and potholes occur due to temperature stress in an environment where there is a severe change in the outside temperature (daily temperature range, four seasons) as in Korea.

Furthermore, in some bridges or special areas, there are places where even polymer-modified asphalt (PMA) pavement hardly withstands severe traffic jam and heavy traffic conditions.

Therefore, it is necessary to construct very strong asphalt pavement with a thick thickness. However, general asphalt pavement should not only be thick but also have strong elasticity, toughness and tensile strength.

Generally, for steel box-girder bridges as well as concrete bridges, a waterproofing process is performed to prevent deterioration of the underlying layer.

However, the waterproof layer (coating film, coating, etc.) has a problem in that it is costly without having structural performance.

Therefore, when a mixture having excellent elasticity as mentioned above and a mixture having high adhesion while having high toughness and tensile strength are applied, asphalt pavement exhibiting both structural performance and durability can be obtained, and thus asphalt pavement having excellent durability while being capable of withstanding heavy traffic loads can be obtained, which is easily constructed and enables rapid traffic opening.

Meanwhile, as a conventional art related to the above-described technology, Korean Patent Application No. 10-2017-0130362 discloses a low-temperature hardening high grade asphalt concrete composition having excellent cracking reduction effect and improved waterproof performance, and a construction method using the same.

SUMMARY OF THE INVENTION

The present invention has been made in order to overcome the above-described problems and is intended to provide a water-impermeable waterproof asphalt concrete composition comprising styrene isoprene styrene (SIS), in which the composition has good waterproof performance and durability, is not easily rutted, aged and/or stripped, and at the same time, can prevent water penetration and potholes, and a method of constructing integrated water-impermeable waterproof asphalt concrete pavement by using this composition and a mixing/feeding system, in which the method enables the composition to be easily placed on-site.

The present invention provides a waterproof asphalt concrete composition comprising: 100 parts by weight of asphalt; 5 to 25 parts by weight of styrene isoprene styrene; 5 to 15 parts by weight of petroleum resin; 500 to 2,000 parts by weight of aggregate; 30 to 150 parts by weight of fine powder aggregate; and 0.1 to 2 parts by weight of bio-resin.

The present invention also provides a method for constructing waterproof asphalt concrete pavement, comprising:

cleaning a target surface to be paved;

placing an asphalt concrete composition for prime coating, which comprises 100 parts by weight of asphalt, 5 to 25 parts by weight of styrene isoprene styrene, 5 to 15 parts by weight of petroleum resin, and 0.1 to 2 parts by weight of bio-resin, on the cleaned target surface by means of a mixing/feeding system;

placing a waterproof asphalt concrete composition, which comprises 100 parts by weight of asphalt, 5 to 25 parts by weight of styrene isoprene styrene, 5 to 15 parts by weight of petroleum resin, 500 to 2,000 parts by weight of aggregate, 30 to 150 parts by weight of fine powder aggregate, and 0.1 to 2 parts by weight of bio-resin, on the target surface on which the asphalt concrete composition for prime coating has been placed, by means of the mixing/feeding system;

compacting the placed waterproof asphalt concrete composition; and curing the compacted waterproof asphalt concrete composition.

DETAILED DESCRIPTION OF THE INVENTION

Hereinafter, the present invention will be described in detail.

In one aspect, the present invention provides a waterproof asphalt concrete composition comprising: 100 parts by weight of asphalt; 5 to 25 parts by weight of styrene isoprene styrene; 5 to 15 parts by weight of petroleum resin; 500 to 2,000 parts by weight of aggregate; 30 to 150 parts by weight of fine powder aggregate; and 0.1 to 2 parts by weight of bio-resin.

In another aspect, the present invention provides a method for constructing waterproof asphalt concrete pavement, comprising:

cleaning a target surface to be paved;

placing an asphalt concrete composition for prime coating, which comprises 100 parts by weight of asphalt, 5 to 25 parts by weight of styrene isoprene styrene, 5 to 15 parts by weight of petroleum resin, and 0.1 to 2 parts by weight of bio-resin, on the cleaned target surface by means of a mixing/feeding system;

placing a waterproof asphalt concrete composition, which comprises 100 parts by weight of asphalt, 5 to 25 parts by weight of styrene isoprene styrene, 5 to 15 parts by weight of petroleum resin, 500 to 2,000 parts by weight of aggregate, 30 to 150 parts by weight of fine powder aggregate, and 0.1 to 2 parts by weight of bio-resin, on the target surface on which the asphalt concrete composition for prime coating has been placed, by means of the mixing/feeding system;

compacting the placed waterproof asphalt concrete composition; and curing the compacted waterproof asphalt concrete composition.

The asphalt that is used in the present invention is not particularly limited as long as it is asphalt that is conventionally used in the art. However, it may preferably be petroleum-based asphalt or an asphalt mixture.

The asphalt mixture is not particularly limited as long as it is an asphalt mixture that is conventionally used in the art. However, the asphalt mixture is preferably a mixture of straight asphalt and at least one selected from among Trinidad lake asphalt, Trinidad epure asphalt and a mixture thereof. More preferably, the asphalt mixture is a mixture of straight asphalt having a penetration index of 20 to 40 and Trinidad lake asphalt and/or Trinidad epure asphalt. Even more preferably, the asphalt mixture is a mixture of 70 to 80 wt % of straight asphalt having a penetration index of 20 to 40 and 20 to 30 wt % of Trinidad lake asphalt or Trinidad epure asphalt.

As used herein, the term "straight asphalt" refers to conventional petroleum asphalt obtained by refining a fraction that remains after drying or distillation of crude petroleum. Straight asphalt that is used in the present invention preferably has a penetration index of 20 to 40 in view of the easiness of pavement of roads.

The straight asphalt is preferably contained in the asphalt mixture in an amount of 70 to 80 wt %. If the content of the straight asphalt in the asphalt mixture is less than 70 wt %, a long period of time can be required for curing of the asphalt pavement, and the softening point of the asphalt mixture can be reduced. If the content of the straight asphalt in the asphalt mixture is more than 80 wt %, the fluidity of the asphalt mixture can be reduced.

In addition, the asphalt that is used in the present invention serves to improve the fluidity of the water-impermeable waterproof asphalt concrete composition comprising SIS according to the present invention, and also to increase the rutting resistance, skid resistance and frictional resistance of the asphalt concrete composition.

The asphalt that is used in the present invention may be Trinidad lake asphalt and/or Trinidad epure asphalt.

The asphalt is preferably contained in the asphalt mixture in an amount of 20 to 30 wt %. If the content of the asphalt in the asphalt mixture is less than 20 wt %, the effect of improving the fluidity, rutting resistance, skid resistance and frictional resistance of the asphalt concrete composition will be insignificant, and if the content of the asphalt is more than 30 wt %, the asphalt concrete composition of the present invention can be softened, and the softening point thereof can be reduced.

The contents of components other than asphalt in the water-impermeable waterproof asphalt concrete composition comprising SIS according to the present invention are based on 100 parts by weight of the asphalt.

Styrene isoprene styrene (SIS) that is used in the present invention serves to suppress cracking of the waterproof asphalt concrete composition, specifically the water-impermeable waterproof asphalt concrete composition comprising SIS, and also to prevent potholes, impart tenacity to the composition and improve the strength of the composition.

Although the preferred amount of styrene isoprene styrene (SIS) used may vary according to the user's choice, it is preferably 5 to 25 parts by weight based on 100 parts by weight of the asphalt.

The petroleum resin that is used in the present invention serves to provide adhesive and waterproof properties, and may be any convention petroleum resin which is generally used in the art for this purpose. However, it is preferably a petroleum resin having a melting temperature of 100° C. or higher, a penetration index of 3 dmm or less, and a viscosity at 140° C. of 50 to 500 cps, more preferably an aliphatic C5 petroleum resin having a melting temperature of 110° C. to 140° C., a penetration index of 0.5 to 2 dmm, and a viscosity at 140° C. of 50 to 300 cps, but is not necessarily limited thereto.

If the melting temperature of the petroleum resin is 100° C. or lower, the petroleum resin will be sticky at high temperature or may form lumps, which may result in defective products, and if the penetration index of the petroleum resin is 0.5 dmm or less, the petroleum resin will be excessively runny, making it difficult to improve the high-temperature physical properties of the asphalt.

In addition, if the viscosity at 140° C. of the petroleum resin is 500 cps or higher, it is higher than the viscosity of asphalt, and thus the manufacturing time becomes excessively long.

Although the preferred amount of petroleum resin used is not particularly limited, it is 5 to 15 parts by weight based on 100 parts by weight of the asphalt.

The aggregate that is used in the present invention is a mineral material for construction that can be consolidated into a lump by the asphalt, the petroleum resin and/or a binder such as styrene isoprene styrene and is chemically stable.

The term "aggregate" refers to sand, gravel, basalt, obsidian, or other similar material.

Specifically, the aggregate may further comprise basic dyke rock having a water absorption rate of about 0.7% and/or bauxite having a water absorption rate of about 5.40%.

Here, the aggregate preferably has a particle size of 0.08 to 13 mm.

The preferred amount of aggregate used is 250 to 2,000 parts by weight based on 100 parts by weight of the asphalt. Preferably, the aggregate comprises, based on 100 parts by weight of the asphalt, 5 to 200 parts by weight of aggregate having a particle size of 0.08 to 2.49 mm, 50 to 200 parts by weight of aggregate having a particle size of 2.5 to 5.99 mm, 45 to 400 parts by weight of aggregate having a particle size of 6 to 9.99 mm, 200 to 600 parts by weight of aggregate having a particle size of 10 to 12.99 mm, and 200 to 600 parts by weight of aggregate having a particle size of 13 mm, in order to maximize the waterproof performance of the composition by filling the voids between the aggregates.

The fine powder aggregate that is used in the present invention serves to improve the waterproof performance by filling the voids between the aggregates, specifically between fine aggregates and coarse aggregates, and is also referred to as a filler. It may be any conventional fine powder aggregate which is generally known in the art for this purpose.

The fine powder aggregate preferably has a particle size of at least less than 0.08 mm, more preferably 0.001 to 0.0799 mm, and is preferably used in an amount of 30 to 150 parts by weight based on 100 parts by weight of the asphalt.

In a conventional art, fine powder aggregate that is used for waterproof asphalt is not particularly limited in its size and is used in combination with aggregate in an amount of 30 parts by weight or less based on 100 parts by weight of asphalt. However, the present invention is intended to maximize the waterproof performance by improving and limiting the particle size of fine powder aggregate and using it together with SIS.

In addition, the term "fine powder aggregate" refers to fine stone powder, fine limestone powder, fine sand powder, fine gravel powder, fine basalt powder, fine obsidian powder, or other similar material.

The bio-resin that is used in the present invention serves to inhibit the occurrence of cracks in the waterproof asphalt concrete composition and improve the adhesion and durability of the composition. The bio-resin is not particularly limited as long as it is a bio-resin which is used for this purpose. Preferably, the bio-resin that is used in the present invention is oil-modified alkyd resin, a fatty acid ester of oil-modified urethane resin, oil-modified epoxy resin, bio-derived polyethylene resin, L-polylactic acid, or a mixture of two or more thereof. More preferably, oil-modified alkyd resin is used.

As used herein, the term "oil-modified" refers to a resin containing an oil component such as fatty acid in the molecule. The use of this oil-modified resin makes it easy to control dispersibility, mechanical properties, curability, and film forming ability.

The preferred amount of bio-resin used is not particularly limited, but is preferably 0.1 to 2 parts by weight based on 100 parts by weight of the asphalt.

In certain embodiments, the waterproof asphalt concrete composition, specifically the water-impermeable waterproof asphalt concrete composition comprising SIS, according to the present invention, may further comprise one or more additives as described below.

In a certain embodiment, the waterproof asphalt concrete composition, specifically the water-impermeable waterproof asphalt concrete composition comprising SIS, according to the present invention, may further comprise perfluoromethoxysilane in an amount of 3 to 15 parts by weight of the asphalt, in order to improve the adhesion and durability of the composition.

In another certain embodiment, the waterproof asphalt concrete composition according to the present invention may further comprise glycidyl methacrylate (GMA)-based resin in an amount of 2 to 15 parts by weight based on 100 parts by weight of the asphalt, in order to improve the impact strength, elongation, tensile strength and/or elasticity of the composition.

The glycidyl methacrylate (GMA)-based resin that is used in the present invention is preferably an ethylene-glycidyl methacrylate (EGMA) copolymer, an ethylene-butyl acrylate-glycidyl methacrylate (EBA-GMA) copolymer, or a mixture thereof.

In still another certain embodiment, the waterproof asphalt concrete composition according to the present invention may further comprise sodium alginate in an amount of 5 to 10 parts by weight based on 100 parts by weight of the asphalt, in order to increase the viscosity of the composition and enhance the adhesion of the composition. If the content of the sodium alginate in the composition is less than 5 parts by weight, the hydrophobicity of the composition will be reduced, and if the content is more than 10 parts by weight, the viscosity of the composition will be excessively increased.

The sodium alginate is a polysaccharide represent by $(C_6H_8O_6)n$. It has a carboxyl group and can be prepared by treating kelp with soda ash. The sodium alginate is viscous by itself, and thus when it is incorporated into the waterproof asphalt concrete composition, it will increase the viscosity of the composition and enhance the adhesion of the composition.

In still another certain embodiment, the waterproof asphalt concrete composition according to the present invention may further comprise sodium stearate in an amount of 1 to 3 parts by weight based on 100 parts by weight of the asphalt, in order to ensure air permeability of the composition. If the sodium stearate is used in an amount of less than 1 part by weight, the desired function cannot be obtained, and if the sodium stearate is used in an amount of more than 3 parts by weight, it can reduce the strength of the composition.

In still another certain embodiment, the waterproof asphalt concrete composition according to the present invention may further comprise diatomite having low density and large surface area in an amount of 1 to 4 parts by weight based on 100 parts by weight of the asphalt, in order to promote drying of the composition.

In still another specific embodiment, the waterproof asphalt concrete composition according to the present invention may further comprise polyvinylidene fluoride resin in an amount of 1 to 5 parts by weight based on 100 parts by weight of the asphalt, in order to improve the cohesion of the asphalt concrete composition and prevent component separation in the composition.

In still another specific embodiment, the waterproof asphalt concrete composition according to the present invention may further comprise polyindolocarbazole in an amount of 1 to 3 parts by weight based on 100 parts by weight of the asphalt, in order to ensure gelling of the asphalt concrete composition.

In still another specific embodiment, the waterproof asphalt concrete composition according to the present invention may further comprise acrylic polymer resin in an amount of 5 to 20 parts by weight based on 100 parts by weight of the asphalt, in order to improve the chemical resistance of the composition.

In still another specific embodiment, the waterproof asphalt concrete composition according to the present invention may further comprise vinyl acetate-diethyl maleate in an amount of 5 to 20 parts by weight based on 100 parts by weight of the asphalt, in order to improve the adhesion and durability of the composition.

In still another specific embodiment, the waterproof asphalt concrete composition according to the present invention may further comprise polymethylsilsesquioxane in an amount of 1 to 5 parts by weight based on 100 parts by weight of the asphalt, in order to improve the adhesion of the composition and to fill the voids of a target surface to be paved to which the asphalt concrete composition is applied.

In still another specific embodiment, the waterproof asphalt concrete composition according to the present invention may further comprise welan gum in an amount of 0.1 to 3 parts by weight based on 100 parts by weight of the asphalt, in order to prevent the components of the composition from being separated from being separated from one another due to the difference in specific gravity therebetween.

In still another specific embodiment, the waterproof asphalt concrete composition according to the present invention may further comprise sodium oleate in an amount of 1 to 5 parts by weight based on 100 parts by weight of the asphalt, in order to increase the workability and quality stability of the composition and to increase the interfacial adhesion to a target surface to which the composition is applied.

In still another specific embodiment, the waterproof asphalt concrete composition according to the present invention may further comprise coco-betaine oleate in an amount of 1 to 5 parts by weight based on 100 parts by weight of the asphalt, in order to improve the plasticity and water retention ability of the composition, prevent cracking of the composition, and increase the strength of the composition.

In still another specific embodiment, the waterproof asphalt concrete composition according to the present invention may further comprise coco-betaine oleate in an amount of 1 to 3 parts by weight based on 100 parts by weight of the asphalt, in order to improve the dispersibility of the asphalt concrete composition and to prevent sticking from occurring after preparation of the composition.

In still another specific embodiment, the waterproof asphalt concrete composition according to the present invention may further comprise a 1:1 mixture (w/w) of nickel powder and chromium powder in an amount of 3 to 10 parts by weight based on 100 parts by weight of the asphalt, in order to impart antibacterial and anti-rust effects. The nickel powder and the chromium powder all have a particle size of 200 mesh or less, and the reason why the nickel powder and the chromium powder are used at a weight ratio of 1:1 is to prevent the homogeneity of the asphalt concrete composition from decreasing when the composition is in a slurry state. In addition, the reason why the 1:1 mixture of the nickel powder having a relatively high specific gravity and the chromium powder having a relatively low specific gravity is used is to impart antibacterial and anti-rust effects while preventing the homogeneity of the asphalt concrete composition from decreasing when the composition is in a slurry state. If the mixture of nickel powder and chromium powder is used in an amount of less than 3 parts by weight based on 100 parts by weight of the asphalt, the effect of imparting the antibacterial and anti-rust effects will be insignificant, and if the mixture of nickel powder and chromium powder is used in an amount of more than 10 parts by weight, the uniform dispersibility of the components in a slurry-state mixture will be decreased.

In still another specific embodiment, the waterproof asphalt concrete composition according to the present invention may further comprise sorbitan monooleic acid ester in an amount of 1 to 5 parts by weight based on 100 parts by weight of the asphalt, in order to improve the strength and waterproof performance of the composition.

In still another specific embodiment, the waterproof asphalt concrete composition according to the present invention may further comprise a 1:1 mixture (w/w) of toluene and gum rosin in an amount of 1 to 5 parts by weight based on 100 parts by weight of the asphalt, in order to maintain the initial adhesion of the composition.

In still another specific embodiment, the waterproof asphalt concrete composition according to the present invention may further comprise silicic acid soda in an amount of 1 to 3 parts by weight based on 100 parts by weight of the asphalt, in order to improve the water resistance of the composition after application to a bridge deck and/or a structure.

In still another specific embodiment, the waterproof asphalt concrete composition according to the present invention may further comprise a temperature sensitive additive in an amount of 1 to 10 parts by weight based on 100 parts by weight of the asphalt, in order to prevent the viscosity of the composition from increasing according to the temperature.

The temperature sensitive additive preferably comprises microcrystalline wax, hydroxy stearic acid, 1,2-hydroxy stearic acid, lauric acid amide, bis-amide wax (ethylene-bis-stearamide), stearic acid amide, oleic acid amide, erucic acid amide, N-oleyl stearic acid amide, N-stearyl stearic acid amide, N-stearyl erucic acid amide, or a mixture of two or more thereof.

In still another specific embodiment, the waterproof asphalt concrete composition according to the present invention may further comprise a boric acid compound in an amount of 1 to 5 parts by weight based on 100 parts by weight of the asphalt, in order to improve the water resistance and scratch resistance of the composition. Examples of the boric acid compound include orthoboric acid, metaboric acid, tetraborate, methyl borate, ethyl borate, and the like. Preferably, orthoboric acid is used.

In still another specific embodiment, the waterproof asphalt concrete composition according to the present invention may further comprise zinc oxide in an amount of 1 to 5 parts by weight based on 100 parts by weight of the asphalt, in order to promote curing of the composition and to prevent corrosion of the composition. If the zinc oxide is used in an amount of less than 1 part by weight, the effect of preventing corrosion of the composition will be reduced, and if the zinc oxide is used in an amount of more than 5 parts by weight, problems will arise in that it reduces the adhesion of the composition due to a rapid reaction and causes cracking.

In still another specific embodiment, the waterproof asphalt concrete composition according to the present invention may further comprise hydrazine phenyl triazine in an amount of 1 to 5 parts by weight based on 100 parts by weight of the asphalt, in order to absorb UV rays and to prevent cracking.

In still another specific embodiment, the waterproof asphalt concrete composition according to the present invention may further comprise polyvinyl alcohol powder in an amount of 1 to 10 parts by weight based on 100 parts by weight of the asphalt, in order to reduce defects such as delamination and distortion by increasing the initial tacky property and initial adhesion of the composition and to provide lightweightness and rigidity.

Here, the polyvinyl alcohol powder is not particularly limited as long as it is conventional polyvinyl alcohol powder known in the art. However, it is preferably polyvinyl alcohol powder comprising 0.05 to 0.4 cc/g of pores having a size of 0.1 to 10 μm.

In still another specific embodiment, the waterproof asphalt concrete composition according to the present invention may further comprise magnesium oxide in an amount of 1 to 10 parts by weight based on 100 parts by weight of the asphalt, in order to prevent the composition from shrinking.

Here, the magnesium oxide can provide the effect of hardening in-situ ground when the ground has a highwater content or when water did flow into the ground during road construction.

In still another specific embodiment, the waterproof asphalt concrete composition according to the present invention may further comprise a water-absorbable polymer in an amount of 1 to 15 parts by weight based on 100 parts by weight of the asphalt.

Here, the water-absorbable polymer swells by absorbing water and acts like a ball bearing, thereby improving the workability of the waterproof asphalt concrete composition, thereby reducing the water content and increasing the strength.

The water-absorbable polymer is preferably at least one selected from among polyacrylate and its derivatives, polyethylene oxide derivatives, and water-absorbable polyurethanes.

In still another specific embodiment, the waterproof asphalt concrete composition according to the present invention may further comprise sodium metasilicate ($Na_2SiO_3$) in an amount of 1 to 5 parts by weight based on 100 parts by weight of the asphalt, in order to improve the compression strength and flexural strength of the composition. If the content of the sodium metasilicate is less than 1 parts by weight based on 100 parts by weight of the asphalt, the fluidity of the composition will be reduced and irregular bubbles will be formed, and if the content is more than 5 parts by weight, the fluidity will decrease rapidly, making it difficult to ensure the curing time.

The sodium metasilicate may be either a hydrate or an anhydride prepared by heating and melting a mixture of quartz and sodium carbonate at 1,000° C. and solidifying the melted material.

In still another specific embodiment, the waterproof asphalt concrete composition according to the present invention may further comprise sodium bentonite in an amount of 1 to 3 parts by weight based on 100 parts by weight of the asphalt, in order to fill voids, prevent water leakage and improve the strength of the composition.

The sodium bentonite absorbs a large amount of water expands to several times its original volume, and becomes a gel-like state, which closely fills the voids of the composition, thereby preventing water leakage and enhancing the strength of the composition, thereby preventing cracking.

In still another specific embodiment, the waterproof asphalt concrete composition according to the present invention may further comprise hypochlorite in an amount of 0.1 to 3 parts by weight based on 100 parts by weight of the asphalt, in order to fill the voids of the composition and prevent voids from occurring during construction.

In still another specific embodiment, the waterproof asphalt concrete composition according to the present invention may further comprise guar gum in an amount of 1 to 10 parts by weight based on 100 parts by weight of the asphalt.

Here, the guar gum is a natural resin which is a water-soluble polymer material. Voids are generated by the interaction between hydration-induced expansion, dehydration-induced shrinkage, and hydration and solidification of the composition, and these voids and the elastic force of the natural resin guar gum can exhibit impact absorption action.

In still another specific embodiment, the waterproof asphalt concrete composition according to the present invention may further comprise dimethyl ammonium chloride in an amount of 5 to 15 parts by weight based on 100 parts by weight of the asphalt, in order to prevent toxic components present on a target surface to be paved from being dissolved out and causing environmental contamination.

In still another specific embodiment, the waterproof asphalt concrete composition according to the present invention may further comprise montmorillonite in an amount of 0.1 to 5 parts by weight based on 100 parts by weight of the asphalt, in order to increase the adhesion of the composition.

Here, the montmorillonite is a monoclinic mineral, a type of clay mineral, and has a hardness of 1 to 1.5, and a specific gravity of 2 to 1.5. It has the property of absorbing water to increase its volume by 7 to 10 times. In addition, it has high ion exchange ability and becomes adhesive when reacting with water, thereby stabilizing the target surface while enhancing the strength of the target surface.

In still another specific embodiment, the waterproof asphalt concrete composition according to the present invention may further comprise kaolinite in an amount of 1 to 7 parts by weight based on 100 parts by weight of the asphalt, in order to increase the bonding strength of the composition.

Here, the kaolinite is based on kaolin, and thus has excellent water absorption ability and viscosity. It is widely used as a material for pottery.

In addition, the kaolinite has a relatively small particle size and a hardness of 2 to 2.5. Thus, when the composition is applied to the target surface, the kaolinite penetrates between the components of the composition, thereby enhancing the strength of the target surface.

In still another specific embodiment, the waterproof asphalt concrete composition according to the present invention may further comprise calcium nitrite in an amount of 1 to 10 parts by weight based on 100 parts by weight of the asphalt, in order to inhibit corrosion of the composition and improve the dispersibility of the composition.

In still another specific embodiment, the waterproof asphalt concrete composition according to the present invention may further comprise sulfoxypolybutylene glycol allyl ether in an amount of 1 to 10 parts by weight based on 100 parts by weight of the asphalt, in order to facilitate blending of the components of the composition and improve the stability of the composition. If the content of the sulfoxypolybutylene glycol allyl ether in the composition is less than 1 part by weight based on based on 100 parts by weight of the asphalt, blending of the components of the composition will not be easy, and if the content is more than 10 parts by weight, the stability of the composition will be reduced.

In still another specific embodiment, the waterproof asphalt concrete composition according to the present invention may further comprise nano-clay in an amount of 0.1 to 5 parts by weight based on 100 parts by weight of the asphalt, in order to ensure the dimensional stability of the composition.

As used herein, the term "nano-clay" refers to clay particles having a size of nanometers.

In still another specific embodiment, the waterproof asphalt concrete composition according to the present invention may further comprise lithium hydroxide in an amount of 1 to 5 parts by weight based on 100 parts by weight of the asphalt, in order to improve curing reactivity by preventing the curing of the waterproof asphalt concrete composition with an organic material.

In still another specific embodiment, the waterproof asphalt concrete composition according to the present invention may further comprise titanium oxide in an amount of 0.1 to 2 parts by weight based on 100 parts by weight of the asphalt, in order to suppress the temperature rise of a target surface such as a road surface to which the waterproof asphalt concrete composition is applied, and to improve the antifouling property of the composition. The titanium oxide has strong acid resistance, alkali resistance and hiding power, and exhibits light reflectivity in the infrared region. Thus, when it is included in the waterproof asphalt concrete composition, it can exhibit the above-described effects.

In still another specific embodiment, the waterproof asphalt concrete composition according to the present invention may further comprise a maleic anhydride-grafted polypropylene compound in an amount of 1 to 10 parts by weight based on 100 parts by weight of the asphalt, in order to enable the components of the composition to be dispersed easily and bonded closely to one another.

The maleic anhydride-grafted polypropylene compound that is used in the present invention is preferably homo-polypropylene, random polypropylene, or a mixture thereof. More preferably, it is a mixture of 50 to 90 wt % of homo-polypropylene and 10 to 50 wt % of random polypropylene.

Here, the random polypropylene is not particularly limited, but may be a copolymer of propylene and a comonomer selected from the group consisting ethylene, butylene and octene.

Preferably, it may be an ethylene-propylene random copolymer. At this time, the content of the comonomer may be 1 to 10 parts by weight, preferably 3 to 8 parts by weight, based on 100 parts by weight of the random polypropylene. If the content of the comonomer is less than 1 part by weight, the graft ratio to the amount of maleic anhydride added cannot be satisfactory, and if the content is more than 10 parts by weight, the mechanical properties and heat resistance of the random polypropylene can be reduced.

In still another specific embodiment, the waterproof asphalt concrete composition according to the present invention may further comprise sodium hexametaphosphate in an amount of 1 to 10 parts by weight based on 100 parts by weight of the asphalt, in order to prevent ionization of the composition.

In still another specific embodiment, the waterproof asphalt concrete composition according to the present invention may further comprise tetrafluoroethylene in an amount of 1 to 10 parts by weight based on 100 parts by weight of the asphalt, in order to improve the elongation and strength of the composition. If the content of the tetrafluoroethylene is less than 1 part by weight based on 100 parts by weight of the asphalt, the effect of improving the elongation and strength will be insignificant, and if the content is more than 10 parts by weight, it will not be cost-effective.

In still another specific embodiment, the waterproof asphalt concrete composition according to the present invention may further comprise alite (C3S) in an amount of 1 to 10 parts by weight based on 100 parts by weight of the asphalt, in order to increase the initial strength of the composition.

As used herein, the term "alite" refers to a mixture such as $3CaO.SiO_2$. The alite promotes hydration so that the supersaturation degree of calcium hydroxide $(Ca(OH)_2)$ in solution reaches a maximum and so that precipitation of the hydration product becomes very active, thereby increasing the initial strength.

In still another specific embodiment, the waterproof asphalt concrete composition according to the present invention may further comprise cellulose acetate butyrate in an amount of 1 to 10 parts by weight based on 100 parts by weight of the asphalt, in order to improve the viscosity and water retention ability of the composition.

Hereinafter, description will be made of a construction method which is performed using the water-impermeable waterproof asphalt concrete composition comprising SIS according to the present invention configured as described.

Here, the construction method described below is one embodiment of the water-impermeable waterproof asphalt concrete composition comprising SIS, and is not limited thereto. The construction method may be any conventional construction method known in the art, which is performed using the waterproof asphalt concrete composition, specifically the water-impermeable waterproof asphalt concrete composition comprising SIS.

In one embodiment, the construction method using the water-impermeable waterproof asphalt concrete composition comprising SIS according to the present invention, comprises:

cleaning a target surface to be paved;

placing an asphalt concrete composition for prime coating, which comprises 100 parts by weight of asphalt, 5 to 25 parts by weight of styrene isoprene styrene, 5 to 15 parts by weight of petroleum resin, and 0.1 to 2 parts by weight of bio-resin, on the cleaned target surface by means of a mixing/feeding system;

placing a waterproof asphalt concrete composition, which comprises 100 parts by weight of asphalt, 5 to 25 parts by weight of styrene isoprene styrene, 5 to 15 parts by weight of petroleum resin, 500 to 2,000 parts by weight of aggregate, 30 to 150 parts by weight of fine powder aggregate, and 0.1 to 2 parts by weight of bio-resin, on the target surface on which the asphalt concrete composition for prime coating has been placed, by means of the mixing/feeding system;

compacting the placed waterproof asphalt concrete composition; and curing after the compacted waterproof asphalt concrete composition.

Here, the mixing/feeding system may be any system comprising an infeed hopper, a mixer, a heating unit, a discharge unit and the like. Preferably, the mixing/feeding system is movable by a transporting means such as a truck.

Hereinafter, the present invention will be described in detail with reference to examples. It is to be understood, however, that these examples are for illustrative purposes only and are not intended to limit the scope of the present invention.

EXAMPLE 1

A waterproof asphalt concrete composition was prepared by mixing 100 g of straight asphalt having a penetration index of 30, 15 g of styrene isoprene styrene, 10 g of aliphatic C5 petroleum resin having a viscosity at 140° C. of 130 cps, 1,200 g of aggregate comprising a 5:5 mixture (w/w) of gravel having a particle size of about 3 mm and gravel having a particle size of about 5 mm, 80 g of fine powder aggregate comprising limestone having a particle size of about 0.03 mm, and 1 g of oil-modified alkyd resin.

EXAMPLE 2

A waterproof asphalt concrete composition was prepared in the same manner as described in Example 1, except that 10 g of perfluoromethoxysilane was further added.

EXAMPLE 3

A waterproof asphalt concrete composition was prepared in the same manner as described in Example 1, except that 10 g of an ethylene-glycidyl methacrylate copolymer was further added.

EXAMPLE 4

A waterproof asphalt concrete composition was prepared in the same manner as described in Example 1, except that 8 g of sodium alginate was further added.

EXAMPLE 5

A waterproof asphalt concrete composition was prepared in the same manner as described in Example 1, except that 2 g of sodium stearate was further added.

EXAMPLE 6

A waterproof asphalt concrete composition was prepared in the same manner as described in Example 1, except that 3 g of diatomite was further added.

EXAMPLE 7

A waterproof asphalt concrete composition was prepared in the same manner as described in Example 1, except that 3 g of polyvinylidene fluoride resin was further added.

EXAMPLE 8

A waterproof asphalt concrete composition was prepared in the same manner as described in Example 1, except that 2 g of polyindolocarbazole was further added.

EXAMPLE 9

A waterproof asphalt concrete composition was prepared in the same manner as described in Example 1, except that 12 g of acrylic polymer resin was further added.

EXAMPLE 10

A waterproof asphalt concrete composition was prepared in the same manner as described in Example 1, except that 10 g of vinyl acetate-diethyl maleate was further added.

EXAMPLE 11

A waterproof asphalt concrete composition was prepared in the same manner as described in Example 1, except that 3 g of polymethylsilsesquioxane was further added.

EXAMPLE 12

A waterproof asphalt concrete composition was prepared in the same manner as described in Example 1, except that 1 g of welan gum was further added.

EXAMPLE 13

A waterproof asphalt concrete composition was prepared in the same manner as described in Example 1, except that 3 g of sodium oleate was further added.

EXAMPLE 14

A waterproof asphalt concrete composition was prepared in the same manner as described in Example 1, except that 3 g of coco-betaine was further added.

EXAMPLE 15

A waterproof asphalt concrete composition was prepared in the same manner as described in Example 1, except that 2 g of sodium rosinate was further added.

EXAMPLE 16

A waterproof asphalt concrete composition was prepared in the same manner as described in Example 1, except that 7 g of a 1:1 mixture (w/w) of nickel powder and chromium powder was further added.

EXAMPLE 17

A waterproof asphalt concrete composition was prepared in the same manner as described in Example 1, except that 3 g of sorbitan monooleic acid ester was further added.

EXAMPLE 18

A waterproof asphalt concrete composition was prepared in the same manner as described in Example 1, except that 3 g of a 1:1 mixture (w/w) of toluene and gum rosin was further added.

EXAMPLE 19

A waterproof asphalt concrete composition was prepared in the same manner as described in Example 1, except that 2 g of silicic acid soda was further added.

EXAMPLE 20

A waterproof asphalt concrete composition was prepared in the same manner as described in Example 1, except that 5 g of microcrystalline wax was further added.

EXAMPLE 21

A waterproof asphalt concrete composition was prepared in the same manner as described in Example 1, except that 3 g of orthoboric acid was further added.

EXAMPLE 22

A waterproof asphalt concrete composition was prepared in the same manner as described in Example 1, except that 3 g of zinc oxide was further added.

EXAMPLE 23

A waterproof asphalt concrete composition was prepared in the same manner as described in Example 1, except that 3 g of hydrazine phenyl triazine was further added.

EXAMPLE 24

A waterproof asphalt concrete composition was prepared in the same manner as described in Example 1, except that 5 g of polyvinyl alcohol powder comprising about 0.1 cc/g of pores having a size of about 5 µm was further added.

EXAMPLE 25

A waterproof asphalt concrete composition was prepared in the same manner as described in Example 1, except that 2 g of magnesium oxide was further added.

EXAMPLE 26

A waterproof asphalt concrete composition was prepared in the same manner as described in Example 1, except that 10 g of a polyethylene oxide derivative was further added.

EXAMPLE 27

A waterproof asphalt concrete composition was prepared in the same manner as described in Example 1, except that 3 g of sodium metasilicate was further added.

EXAMPLE 28

A waterproof asphalt concrete composition was prepared in the same manner as described in Example 1, except that 2 g of sodium bentonite was further added.

EXAMPLE 29

A waterproof asphalt concrete composition was prepared in the same manner as described in Example 1, except that 2 g of hypochlorite was further added.

EXAMPLE 30

A waterproof asphalt concrete composition was prepared in the same manner as described in Example 1, except that 5 g of guar gum was further added.

EXAMPLE 31

A waterproof asphalt concrete composition was prepared in the same manner as described in Example 1, except that 10 g of dimethyl ammonium chloride was further added.

EXAMPLE 32

A waterproof asphalt concrete composition was prepared in the same manner as described in Example 1, except that 3 g of montmorillonite was further added.

EXAMPLE 33

A waterproof asphalt concrete composition was prepared in the same manner as described in Example 1, except that 4 g of kaolinite was further added.

EXAMPLE 34

A waterproof asphalt concrete composition was prepared in the same manner as described in Example 1, except that 5 g of calcium nitrite was further added.

EXAMPLE 35

A waterproof asphalt concrete composition was prepared in the same manner as described in Example 1, except that 5 g of sulfoxypolybutylene glycol allyl ether was further added.

EXAMPLE 36

A waterproof asphalt concrete composition was prepared in the same manner as described in Example 1, except that 3 g of nano-clay having an average particle diameter of about 10 nm was further added.

EXAMPLE 37

A waterproof asphalt concrete composition was prepared in the same manner as described in Example 1, except that 2 g of lithium hydroxide was further added.

EXAMPLE 38

A waterproof asphalt concrete composition was prepared in the same manner as described in Example 1, except that 1 g of titanium oxide was further added.

EXAMPLE 39

A waterproof asphalt concrete composition was prepared in the same manner as described in Example 1, except that 5 g of a maleic anhydride-grafted polypropylene compound prepared by adding 1.3 wt %, based on the total weight of the polymer compound, of maleic anhydride to a mixture of 90 wt % of homo-polypropylene and 10 wt % of random polypropylene (ethylene content: 5 wt %), was further added.

EXAMPLE 40

A waterproof asphalt concrete composition was prepared in the same manner as described in Example 1, except that 5 g of sodium hexametaphosphate was further added.

EXAMPLE 41

A waterproof asphalt concrete composition was prepared in the same manner as described in Example 1, except that 5 g of tetrafluoroethylene was further added.

EXAMPLE 42

A waterproof asphalt concrete composition was prepared in the same manner as described in Example 1, except that 5 g of alite was further added.

EXAMPLE 43

A waterproof asphalt concrete composition was prepared in the same manner as described in Example 1, except that 5 g of cellulose acetate butyrate was further added.

EXAMPLE 44

A waterproof asphalt concrete composition was prepared in the same manner as described in Example 1, except that the additives used in Example 2 to Example 43 were all added to Example 1.

Test

An asphalt concrete layer having a thickness of about 60 mm was prepared using each of the compositions prepared in the Examples, and then the waterproof performance, curability at low temperature (at −10° C.), cracking, dynamic stability, indirect tensile strength, strength against deformation, compression strength and the like thereof were measured. The results of the measurement are shown in Table 1 below.

Here, the dynamic stability was measured by a deformation strength test according to the Kim Test in order to evaluate the rutting resistance, and the indirect tensile strength was measured in order to evaluate the cracking resistance. In addition, the compression strength was measured using an asphalt compressive strength tester.

TABLE 1

| | Waterproof performance | Gelling/hr (at −10° C.) | Cracking | Dynamic stability (pass/mm) | Indirect tensile strength (ITS) | Deformation strength (MPa) | Compression strength (MPa) After 7 days | After 28 days |
|---|---|---|---|---|---|---|---|---|
| Example 1  | 98% | 66 | Absent | 1884 | 0.88 | 5.83 | 31.3 | 85 |
| Example 2  | 99% | 66 | Absent | 1857 | 0.88 | 5.82 | 32.7 | 87 |
| Example 3  | 98% | 67 | Absent | 1849 | 0.89 | 5.88 | 32.2 | 87 |
| Example 4  | 99% | 66 | Absent | 1858 | 0.87 | 5.78 | 31.1 | 83 |
| Example 5  | 98% | 68 | Absent | 1874 | 0.85 | 5.84 | 31.2 | 82 |
| Example 6  | 98% | 68 | Absent | 1884 | 0.85 | 5.78 | 31.3 | 86 |
| Example 7  | 98% | 66 | Absent | 1843 | 0.87 | 5.72 | 34.6 | 80 |
| Example 8  | 99% | 65 | Absent | 1863 | 0.85 | 5.64 | 31.2 | 83 |
| Example 9  | 98% | 64 | Absent | 1875 | 0.86 | 5.70 | 33.1 | 82 |
| Example 10 | 99% | 65 | Absent | 1885 | 0.86 | 5.94 | 27.3 | 86 |
| Example 11 | 99% | 68 | Absent | 1868 | 0.86 | 5.74 | 32.2 | 80 |
| Example 12 | 99% | 63 | Absent | 1845 | 0.87 | 5.82 | 32.4 | 83 |
| Example 13 | 98% | 67 | Absent | 1847 | 0.88 | 5.82 | 31.5 | 85 |
| Example 14 | 99% | 67 | Absent | 1841 | 0.86 | 5.81 | 32.2 | 86 |
| Example 15 | 98% | 65 | Absent | 1882 | 0.89 | 5.74 | 32.2 | 85 |
| Example 16 | 99% | 67 | Absent | 1873 | 0.88 | 5.76 | 31.1 | 86 |
| Example 17 | 99% | 66 | Absent | 1885 | 0.89 | 5.74 | 31.2 | 84 |
| Example 18 | 99% | 67 | Absent | 1868 | 0.89 | 5.81 | 33.5 | 84 |
| Example 19 | 99% | 68 | Absent | 1842 | 0.87 | 5.74 | 32.4 | 86 |
| Example 20 | 99% | 65 | Absent | 1845 | 0.87 | 5.70 | 31.3 | 87 |
| Example 21 | 99% | 68 | Absent | 1881 | 0.88 | 5.78 | 31.2 | 88 |
| Example 22 | 98% | 67 | Absent | 1842 | 0.89 | 5.73 | 33.5 | 87 |
| Example 23 | 99% | 68 | Absent | 1859 | 0.89 | 5.77 | 32.4 | 83 |
| Example 24 | 99% | 67 | Absent | 1884 | 0.88 | 5.80 | 31.2 | 86 |
| Example 25 | 98% | 69 | Absent | 1882 | 0.88 | 5.78 | 33.5 | 84 |
| Example 26 | 99% | 69 | Absent | 1854 | 0.87 | 5.76 | 32.4 | 86 |
| Example 27 | 98% | 68 | Absent | 1882 | 0.87 | 5.67 | 32.6 | 86 |
| Example 28 | 99% | 68 | Absent | 1873 | 0.89 | 5.81 | 32.2 | 87 |
| Example 29 | 99% | 69 | Absent | 1874 | 0.88 | 5.83 | 32.3 | 88 |
| Example 30 | 98% | 67 | Absent | 1879 | 0.89 | 5.78 | 32.3 | 83 |
| Example 31 | 98% | 67 | Absent | 1885 | 0.88 | 5.81 | 31.5 | 87 |
| Example 32 | 99% | 68 | Absent | 1884 | 0.88 | 5.79 | 33.5 | 85 |
| Example 33 | 99% | 67 | Absent | 1874 | 0.87 | 5.76 | 32.4 | 86 |
| Example 34 | 99% | 67 | Absent | 1886 | 0.87 | 5.78 | 32.6 | 86 |

TABLE 1-continued

| | Waterproof performance | Gelling/hr (at −10° C.) | Cracking | Dynamic stability (pass/mm) | Indirect tensile strength (ITS) | Deformation strength (MPa) | Compression strength (MPa) | |
|---|---|---|---|---|---|---|---|---|
| | | | | | | | After 7 days | After 28 days |
| Example 35 | 99% | 67 | Absent | 1885 | 0.88 | 5.82 | 32.4 | 88 |
| Example 36 | 99% | 69 | Absent | 1884 | 0.89 | 5.83 | 32.2 | 88 |
| Example 37 | 99% | 69 | Absent | 1874 | 0.88 | 5.83 | 33.2 | 88 |
| Example 38 | 98% | 68 | Absent | 1878 | 0.89 | 5.79 | 32.4 | 83 |
| Example 39 | 99% | 68 | Absent | 1885 | 0.88 | 5.81 | 31.5 | 83 |
| Example 40 | 99% | 68 | Absent | 1885 | 0.88 | 5.81 | 33.5 | 85 |
| Example 41 | 99% | 68 | Absent | 1874 | 0.87 | 5.82 | 32.4 | 86 |
| Example 42 | 98% | 67 | Absent | 1887 | 0.87 | 5.77 | 32.5 | 87 |
| Example 43 | 98% | 67 | Absent | 1885 | 0.88 | 5.82 | 32.4 | 88 |
| Example 44 | 99% | 68 | Absent | 1884 | 0.88 | 5.81 | 33.4 | 87 |

As can be seen in Table 1 above, the water-impermeable waterproof asphalt concrete compositions comprising SIS, prepared in the Examples, showed dynamic stability, indirect tensile strength and deformation strength. Furthermore, these asphalt concrete compositions were gelled at low temperature, indicating that they were cured rapidly. In addition, these asphalt concrete compositions had no cracks, and had a compression strength of 75 MPa or higher after 28 days, suggesting that all the waterproof asphalt concrete compositions of the Examples have high strengths.

As described above, the water-impermeable waterproof asphalt concrete composition comprising SIS according to the present invention has excellent waterproof performance due to its high cohesion and adhesion, has good durability, and is not easily rutted, aged and/or stripped. In addition, it has a performance grade of PG 82-34, and can prevent water penetration and potholes. Furthermore, according to the present invention, asphalt concrete for prime coating and waterproof asphalt concrete can be applied to form an integrated structure by means of a mixing/feeding system and can also be easily placed on site.

What is claimed is:

1. A waterproof asphalt concrete composition comprising:
   100 parts by weight of asphalt;
   5 to 25 parts by weight of styrene isoprene styrene;
   5 to 15 parts by weight of petroleum resin;
   500 to 2,000 parts by weight of aggregate;
   30 to 150 parts by weight of fine powder aggregate;
   0.1 to 2 parts by weight of bio-resin; and
   wherein the aggregate comprises, based on 100 parts by weight of the asphalt, 5 to 200 parts by weight of aggregate having a particle size of 0.08 to 2.49 mm, 50 to 200 parts by weight of aggregate having a particle size of 2.5 to 5.99 mm, 45 to 400 parts by weight of aggregate having a particle size of 6 to 9.99 mm, 200 to 600 parts by weight of aggregate having a particle size of 10 to 12.99 mm, and 200 to 600 parts by weight of aggregate having a particle size of 13 mm.

2. The waterproof asphalt concrete composition of claim 1, wherein the fine powder aggregate has a particle size of 0.001 to 0.0799 mm.

3. The waterproof asphalt concrete composition of claim 1, wherein the bio-resin is oil-modified alkyd resin, a fatty acid ester of oil-modified urethane resin, oil-modified epoxy resin, bio-derived polyethylene resin, L-polylactic acid, or a mixture of two or more thereof.

4. The waterproof asphalt concrete composition of claim 1, wherein the petroleum resin has a melting temperature of 100° C. or higher, a penetration index of 3 dmm or less, and a viscosity at 140° C. of 50 to 500 cps.

5. The waterproof asphalt concrete composition of claim 4, wherein the petroleum resin is an aliphatic C5 petroleum resin having a melting temperature of 110° C. to 140° C., a penetration index of 0.5 to 2 dmm and a viscosity at 140° C. of 50 to 300 cps.

6. The waterproof asphalt concrete composition of claim 1, wherein the aggregate is a mineral material consolidatable into a lump by at least one of an asphalt, a petroleum resin and a binder.

7. The waterproof asphalt concrete composition of claim 6, wherein the binder is a styrene isoprene styrene and is chemically stable.

8. The waterproof asphalt concrete composition of claim 1, wherein the aggregate is one of the following: sand, gravel, basalt or obsidian.

9. The waterproof concrete composition of claim 1, wherein the asphalt is a petroleum-based asphalt or an asphalt mixture.

10. The waterproof asphalt concrete composition of claim 9, wherein the asphalt mixture is a mixture of straight asphalt and at least one selected from Trinidad lake asphalt, Trinidad epure asphalt and a mixture thereof.

11. The waterproof asphalt concrete composition of claim 10, wherein the asphalt mixture is the mixture of straight asphalt having a penetration index of 20 to 40 and at least one of the Trinidad lake asphalt and the Trinidad epure asphalt.

12. The waterproof asphalt concrete composition of claim 10, wherein the asphalt mixture is a mixture of 70 to 80 weight % of the straight asphalt having the penetration index of 20 to 40 and 20 to 30 weight % of the Trinidad lake asphalt or Trinidad epure asphalt.

13. The waterproof asphalt concrete composition of claim 1, wherein the fine powder aggregate is one of the following: fine stone powder, fine limestone powder, fine sand powder, fine gravel powder, fine basalt powder or fine obsidian powder.

14. A method for constructing a waterproof asphalt concrete pavement, comprising:
   cleaning a target surface to be paved;
   placing an asphalt concrete composition for prime coating, which comprises 100 parts by weight of asphalt, 5 to 25 parts by weight of styrene isoprene styrene, 5 to 15 parts by weight of petroleum resin, and 0.1 to 2 parts by weight of bio-resin, on the cleaned target surface by using a mixing/feeding system;
   placing a waterproof asphalt concrete composition of claim 1 on the target surface on which the asphalt concrete composition for prime coating has been placed, by using the mixing/feeding system;

compacting the placed waterproof asphalt concrete composition; and curing the compacted waterproof asphalt concrete composition.

* * * * *